United States Patent
Lake-Schaal et al.

(10) Patent No.: US 12,208,333 B2
(45) Date of Patent: *Jan. 28, 2025

(54) FLEXIBLE COMPUTER GAMING BASED ON MACHINE LEARNING

(71) Applicant: Warner Bros. Entertainment Inc., Burbank, CA (US)

(72) Inventors: Gary Lake-Schaal, Los Angeles, CA (US); Lewis S. Ostrover, Los Angeles, CA (US); Matthew Huard, San Francisco, CA (US); Adam Husein, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,128

(22) Filed: Oct. 17, 2023

(65) Prior Publication Data
US 2024/0216816 A1    Jul. 4, 2024

Related U.S. Application Data

(63) Continuation of application No. 16/846,268, filed on Apr. 10, 2020, now Pat. No. 11,826,653, which is a
(Continued)

(51) Int. Cl.
*A63F 13/67* (2014.01)
*A63F 13/77* (2014.01)
(Continued)

(52) U.S. Cl.
CPC .............. *A63F 13/67* (2014.09); *A63F 13/77* (2014.09); *A63F 13/79* (2014.09); *G06N 5/04* (2013.01);
(Continued)

(58) Field of Classification Search
None
See application file for complete search history.

(56) References Cited

U.S. PATENT DOCUMENTS

2001/0008852 A1* 7/2001 Izumi ..................... A63F 13/79
463/42
2003/0045356 A1* 3/2003 Thomas .................. A63F 13/30
463/41
(Continued)

FOREIGN PATENT DOCUMENTS

| CN | 107050857 A | 4/2017 |
| CN | 107158702 A | 9/2017 |
| CN | 107158708 A | 9/2017 |

OTHER PUBLICATIONS

WO, PCT/US2018/055305 ISR and Written Opinion, Apr. 18, 2019.
(Continued)

*Primary Examiner* — Jason T Yen
(74) *Attorney, Agent, or Firm* — Bookoff McAndrews, PLLC

(57) ABSTRACT

A game modification engine modifies configuration settings affecting game play and the user experience in computer games after initial publication of the game, based on device level and game play data associated with a user or cohort of users and on machine-learned relationships between input data and a use metric for the game. The modification is selected to improve performance of the game as measured by the use metric. The modification may be tailored for a user cohort. The game modification engine may define the cohort automatically based on correlations discovered in the input data relative to a defined use metric.

20 Claims, 9 Drawing Sheets

Related U.S. Application Data continuation of application No. PCT/US2018/055305, filed on Oct. 10, 2018.

(60) Provisional application No. 62/571,148, filed on Oct. 11, 2017.

(51) Int. Cl.
*A63F 13/79* (2014.01)
*G06N 5/04* (2023.01)
*G06N 20/00* (2019.01)

(52) U.S. Cl.
CPC ...... G06N 20/00 (2019.01); *A63F 2300/5533* (2013.01); *A63F 2300/6027* (2013.01)

(56) References Cited

U.S. PATENT DOCUMENTS

| | | | | |
|---|---|---|---|---|
| 2010/0227678 | A1* | 9/2010 | Konishi | A63F 13/30 463/29 |
| 2014/0011592 | A1* | 1/2014 | Kim | A63F 13/35 463/40 |
| 2014/0031114 | A1 | 1/2014 | Davison et al. | |
| 2014/0274354 | A1* | 9/2014 | George | G06Q 30/0631 463/29 |
| 2015/0273342 | A1 | 10/2015 | Olson et al. | |
| 2016/0180811 | A1* | 6/2016 | Colenbrander | G09G 5/10 356/402 |
| 2017/0259177 | A1* | 9/2017 | Aghdaie | G06N 7/01 |
| 2018/0078858 | A1* | 3/2018 | Chai | A63F 13/216 |
| 2018/0093191 | A1* | 4/2018 | Lee | A63F 13/69 |
| 2018/0243656 | A1* | 8/2018 | Aghdaie | A63F 13/67 |
| 2019/0102994 | A1* | 4/2019 | Riggs | G07F 17/3225 |

OTHER PUBLICATIONS

KR, KR 10-2020-7013365 Office Action, Aug. 3, 2023.

J.B. MacQueen, "Some methods for classification and analysis of multivariate observations", 1967, Berkeley Symp. On Math. Statist. And Prob., pp. 281-297, https://digitalassets.lib.berkeley.edu.math/ucb/text/math_s5_v1_article-17.pdf (Year: 1967).

China National Intellectual Property Administration, First Office Action, Application No. 201880079610.1, 7 pages, Dec. 20, 2023, China.

China National Intellectual Property Administration, First Office Action, Application No. 201880079610.1, English Translation, 12 pages, Dec. 20, 2023, China.

Lysenko, N., International Search Report and Written Opinion, Application No. PCT/US2018/055305, Jan. 28, 2019, pp. 1-8, Federal Institute Property, Moscow, Russia.

\* cited by examiner

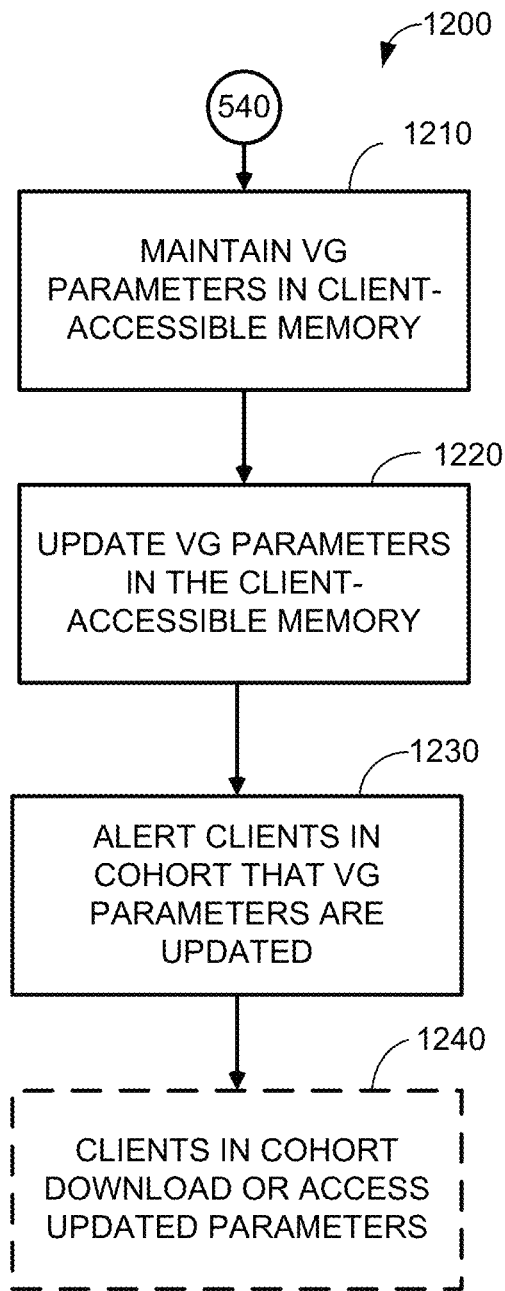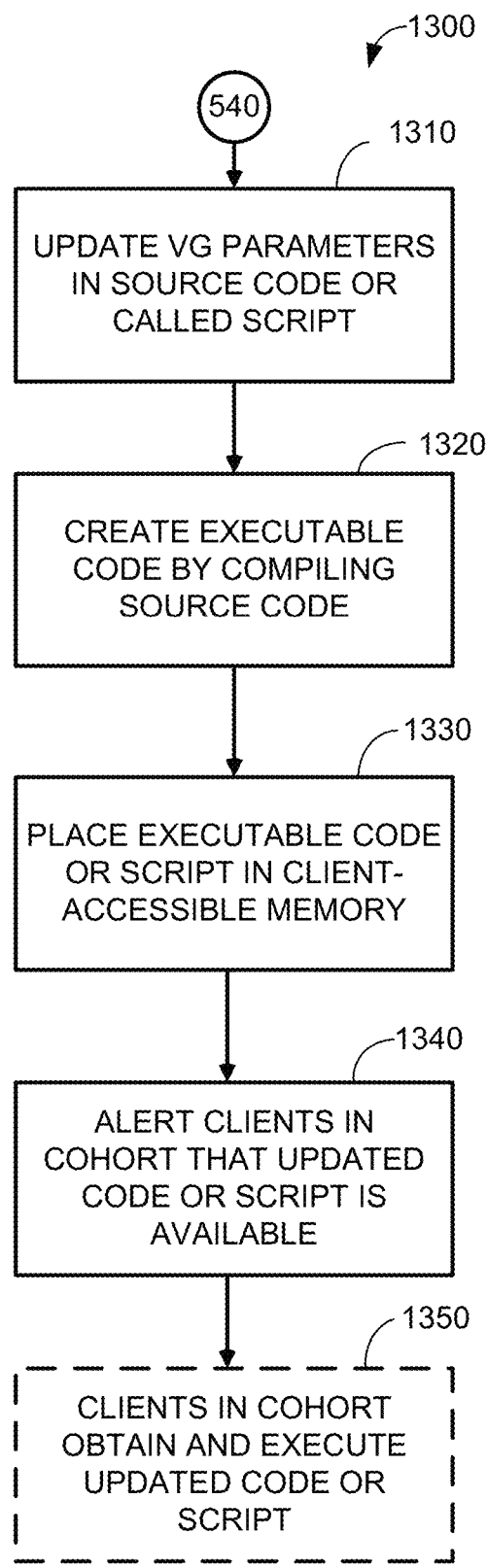

FLEXIBLE COMPUTER GAMING BASED ON MACHINE LEARNING

PRIORITY CLAIM

The present application is a continuation U.S. patent application Ser. No. 16/846,268, filed Apr. 10, 2020, which is a continuation of International Patent Application No. PCT/US2018/055305 filed Oct. 10, 2018, which claims priority to U.S. Provisional Application No. 62/571,148, filed Oct. 11, 2017, which applications are incorporated herein by reference in their entireties.

FIELD

The present disclosure relates to methods and apparatus for computer games, and more particularly to application of machine learning to modify video games after initial publication.

BACKGROUND

Computer games include at least video games, virtual reality games, augmented reality games, arcade games, wherein the game play and user interface are controlled by a processor operating executable instructions and accessing graphical data that together determine the logic of game play and the user's game environment, including but not limited to graphics and audio controlled by the computer. Computer games may be played on game devices in a variety of form factors, including mobile devices, laptop and desktop computers, high-bandwidth servers for local or remote multiplayer arenas, virtual reality headgear, augmented reality glasses, or other wearable computing devices.

A video game is a computer game by one or more players, wherein game play depends on each player interacting with a digitally-defined game process (the "game engine") operating on one or more computer processors. Players usually view the game state and their own progress in the game through a graphical user interface (GUI), although other user interfaces are possible. Each player may be represented in the GUI by one or more avatars. Computer-driven non-player characters may resemble and interact with avatars directly controlled by players. Players may compete with each other and/or with the computer to complete one or more objectives for the game, including but not limited to prevailing in contests between avatars or between an avatar and one or more non-player characters (NPCs), acquiring in-game assets, or developing in-game assets and allies. The game engine control progress of the game and tracks changes in the game state as play proceeds.

In a video game, the GUI is displayed on one or more video screens. Video game screens exist in various form factors, for example, mobile screens in smart phones, notepad computers, and laptop computers; more permanent larger screens used with desktop computers; televisions and home theater setups driven by game consoles or home computers; and large-screen theater-style screens for competitive gaming matches and exhibitions. Mixed-reality GUIs are designed for wearable virtual reality or augmented-reality glasses, goggles and visors, alone or in combination with video screens. Arcade games are usually video games but can also be adapted for mixed reality interfaces. In an arcade game, the display and user equipment is permanently installed or coupled to an arcade that is designed for shared use by customers or members of the arcade, usually in conjunction with payment of tokens.

It would be desirable, therefore, to develop new methods for providing flexible computer games, that overcome these and other limitations of the prior art and enhance flexible game play for users and game providers.

SUMMARY

This summary and the following detailed description are complementary parts of an integrated disclosure and may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as will be apparent from the respective disclosures.

The present disclosure describes a method and apparatus for configuring a flexible computer game, based on a machine-learned correlation of a result metric to player data. Players can be divided into cohorts based on available data. The computer game is automatically configured on the fly for each cohort or for each player, based on player data, and without needing user control of configuration settings. Effects of changing game parameters on business metrics post publication are tested prior to release. Configuration changes predicted to increase a desired metric are released post-publication, causing the game experience of players or player cohorts to evolve over time.

In an aspect of the disclosure, a computer-implemented method for configuring a flexible video game may include receiving, by one or more processors, multi-parameter data including at least game play data and device-level data from a plurality of clients playing a video game. The method may further include detecting a complex association between the multi-parameter data and a defined metric measuring use of the video game, using a machine-learning algorithm operating on one or more hardware processors. The method may further include predicting an effect of changing one or more video game parameters on the defined metric, based on the complex association, using the machine-learning algorithm or a different machine learning algorithm, and configuring the video game after initial publication thereof to improve the defined metric, based on the predicting. The method may include numerous additional operations and aspects, that are described in the detailed description that follows.

The method may be implemented in any suitable programmable computing apparatus, by provided program instructions in a non-transitory computer-readable medium that, when executed by a computer processor, cause the apparatus to perform the described operations. An apparatus may include a computer or system of computers used in video game management, e.g., a server or one or more processors of a server or group of servers. Elements of a system in which the method may be used include the server, several client devices in any of the form factors mentioned above for playing the computer game and for supplying the multi-parameter data, in which the server and clients communicate via a network or networks.

To the accomplishment of the foregoing and related ends, one or more examples describe and enable features pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIGS. 12-13 are flow diagrams illustrating more detailed aspects for configuring a video game after initial publication to improve a defined metric, based on machine learning-based predictions.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
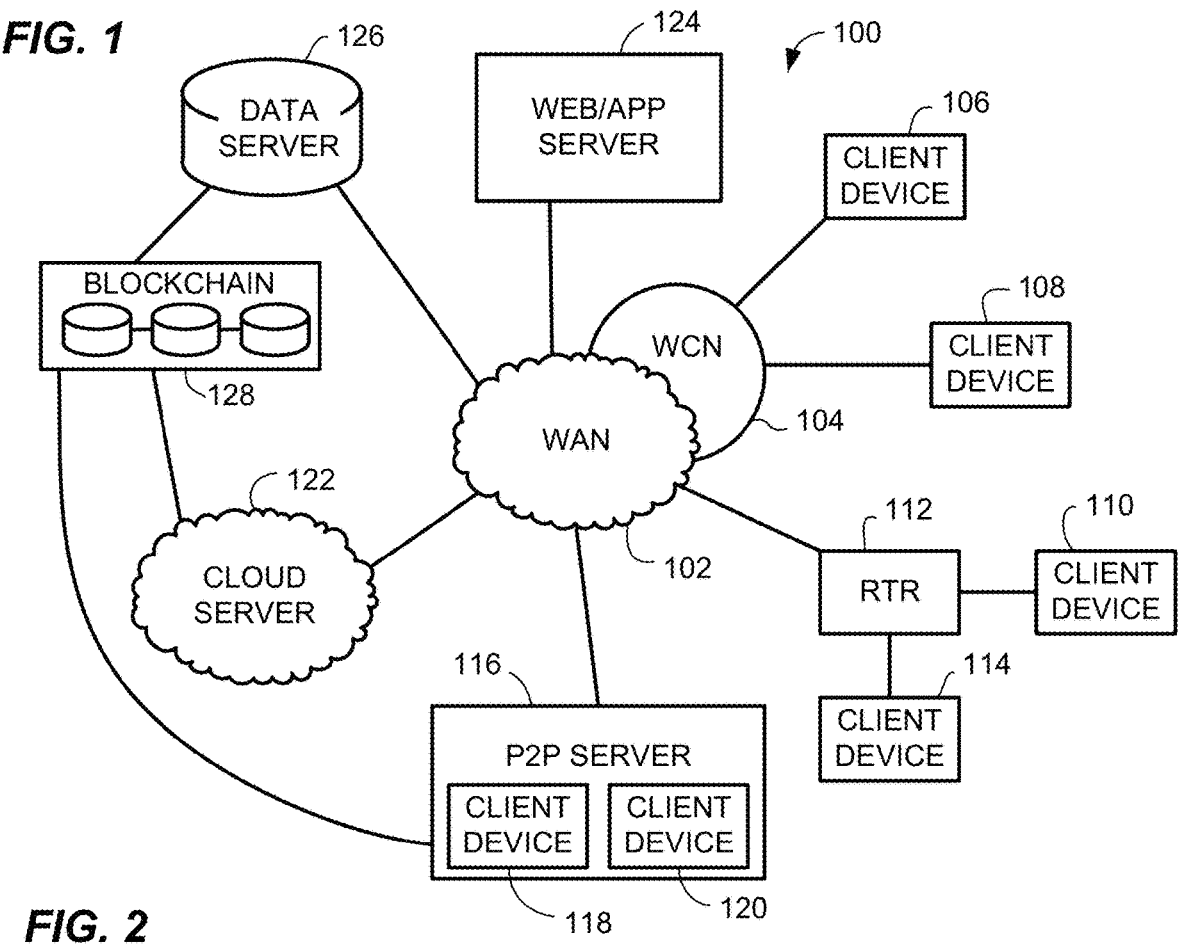
FIG. 1 is a block diagram showing a client-server environment in which the methods and apparatus described herein may be used.

Referring to FIG. 1, a client-server environment 100 for use with the methods and apparatus described herein may include various computer servers and client entities in communication via one or more networks, for example a Wide Area Network (WAN) 102 (e.g., the Internet) and/or a wireless communication network (WCN) 104, for example a cellular telephone network. Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more data servers 126 for holding data, for example video, audio-video, audio, and graphical content for consumption using a client device, software for execution on or in conjunction with client devices for example video games and applications for any purpose, and data collected from users or client devices. Data collected from client devices or users may include, for example, device level data and application data. As used herein, "device level data" means time-correlated data indicating a machine state or action for a client device. Device level data may be collected by a background (not user-facing) application operating on the client device, and transmitted to a data sink, for example, a cloud-based data server 122 or discrete data server 126. Application data means application state data, including but not limited to records of user interactions with an application or other application inputs, outputs or internal states. Applications and data may be served from other types of servers, for example, any server accessing a distributed blockchain data structure 128, or a peer-to-peer (P2P) server 116 such as may be provided by a set of client devices 118, 120 operating contemporaneously as micro-servers or clients.

The environment 100 may include various client devices, for example a mobile smart phone client 106 and notepad client 108 connecting to servers via the WCN 104 and WAN 102; any one of the foregoing client devices, or a personal computer client device 110, a mixed reality (e.g., virtual reality or augmented reality) client device 114, a Point-of-Sale (POS) device, a social robot; an audio-only terminal, or smart "Internet of Things" (IoT) appliance connecting to servers via a router 112 and the WAN 102. In general, client devices may be, or may include, computers used by users to access data or applications provided via a server.

Figure 2:
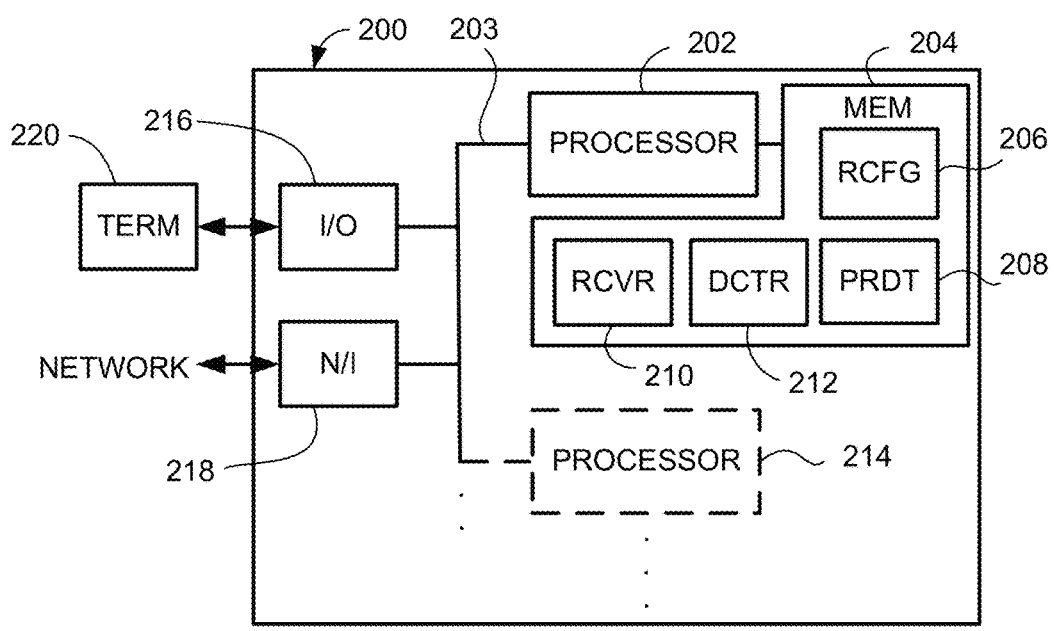
FIG. 2 is a block diagram of a computer server for configuring a flexible computer game, based on a machine-learned correlation of a result metric to input data.

FIG. 2 shows a generic computer server 200 for configuring a flexible video game, which may be used in the environment 100. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for a client device operating a video game, via a local bus 203 or other internal connection. It should be appreciated that some types of servers, e.g., cloud servers, sever farms, or P2P servers, may include multiple instances of discrete servers 200 that cooperate to perform functions of a single server.

The server 200 may include a network interface 218 for sending and receiving applications and data, including but not limited to input data used for predicting effectiveness of a video game configuration, and game configuration data selected thereby.

Each processor 202, 214 of the server 200 may be operatively coupled to at least one memory 204 holding functional modules 206, 208, 210, 212 of an application or applications for performing a method as described herein. The modules may include, for example, a communication module 210 for communicating with client devices and servers. The communication module 210 may include instructions that when executed by the processor 202 and/or 214 cause the server to perform one or more of: receiving multi-parameter data including at least game play data and device-level data from a plurality of clients playing a video game, accessing a data structure of sample or real-time game play data and device-level data derived from the multiple client devices, and/or accessing a data structure that defines correlations between individual records of the sample or real-time game play data and device-level data based on personal identifiers, personal characteristics, client device identifiers, client device characteristics or any combination of the foregoing identifiers and characteristics. As used herein, "real-time" used as an adjective or adverb means that the module or process being described must operate within a time constraint that depends on an application requirement, for example, so that a user does not perceive a time lag between an input and a response.

The modules may further include, for example, a machine learning process (MLP) module 212 for detecting a complex association between the multi-parameter data and a defined metric measuring use of the video game, using a machine-learning algorithm operating on one or more hardware processors. Defined metrics may include, for example, length of engagement measured in time increments, execution cycles or progress in achieving game objectives; frequency of play; quantity of invitations for play sent to others, level of game play reached; rate of achieving game objectives, or other measures. Further examples are provided later in the disclosure below. Modern video games may make use of hundreds of variables and parameters, changes in any one or combination of which may be defined as a metric using familiar mathematical tools such as, for example, sums, rates, averages, medians, standard deviations, variances and so forth. The MLP module 212 may include instructions that when executed by the processor 202 and/or 214 cause the server to perform applying a machine learning process encoded in a computer language to the multi-parameter data and the correlations accessed by the communications module 210, and deriving a complex association between an array of multi-parameter input data collected from clients and servers regarding use of one or more video games, and a defined metric. As used herein, a "complex association" means a statistically significant correlation between a set of multi-parameter values and a defined metric, that is too complex to be human-observable. The metric is chosen by a system designer, and different metrics may be used for different embodiments of the server 200. Further functional details of the MLP module 212 may be as described herein in connection with FIGS. 4-6.

The modules may further include, for example, a prediction module 208 for predicting an effect of changing one or more video game parameters on the defined metric, based on the complex association. The prediction module may use the same machine-learning algorithm as the MLP module 212 or a different machine learning algorithm. The predicting module uses a different process flow than the MLP module 212, because it predicts effects of data changes outside the scope of the MLP module's training set. For example, the prediction module 208 predicts effects of changing one or more video game parameters on some metric related to use of the game (e.g., an amount or duration of use by one or more players). The video game parameters are not part of the set MLP module's training set and have no direct relationship to values of the input parameters. To make its predictions, the prediction module 208 may make use of additional machine learning processing, and/or may use the complex associations and input sets from the MLP module 212. Further functional details of the predicting module may be as described herein in connection with FIGS. 5 and 7-11.

The modules may further include, for example, a configuration module 206 for configuring the video game after initial publication thereof to improve the defined metric, based on the predicting. "To improve the defined metric" means to cause the metric to change in a desired way, e.g., to increase or decrease depending on whether the metric is desirable or undesirable. The configuration model 206 develops a set of video game parameters, or changes in video game parameters, that once published, alters play of the video game for which the input data, complex associations and prediction have been obtained by the other modules 208, 210, 212. The configuration module 206 may operate at least in part by publishing changes in video game parameters to one or more memory locations where the parameters will take effect when at least one of the client devices executes the video game engine that makes use of the parameter set. Further functional details of the configuring module 206 may be as described herein in connection with FIGS. 5 and 11-13. Upon execution of the processes performed by the modules 206, 208, 210 and 212, configuration changes made by the configuration module 206 will result in a desired improvement in the target metric.

The memory 204 may hold further modules or instructions that when executed by the processor causes the server 200 to perform other functions, for example more detailed functional aspects of the modules and methods described herein. For further example, the memory may hold one or more additional modules for assigning a likelihood of a targeted outcome, e.g., a defined consumer response to any message characterized by the parameter set, based on input data and a machine-detected complex association between the input data and the likelihood of a game client responding to a message. The modules may further include a message generation module when executed by the processor causes the server to generate a message, for example by selecting a message characterized by the parameter set from a set of predetermined messages or by generating a message using a semantic engine, based on device level input data (which may also be called "log-level" input data) correlated to any one or more of the personal identifiers, personal characteristics, client device identifiers, and client device characteristics. The server may generate the message to optimize the predicted result of sending the message within a set of message constraints. Further details of a messaging application may be as described in U.S. Patent Application 62/560,637 filed Sep. 19, 2017, which is incorporated herein by reference. The memory 204 may contain additional instructions, for example an operating system, and supporting modules. The communications module 210, or a different module, may be used to send the selected message to a client device or set of devices.

Figure 3:
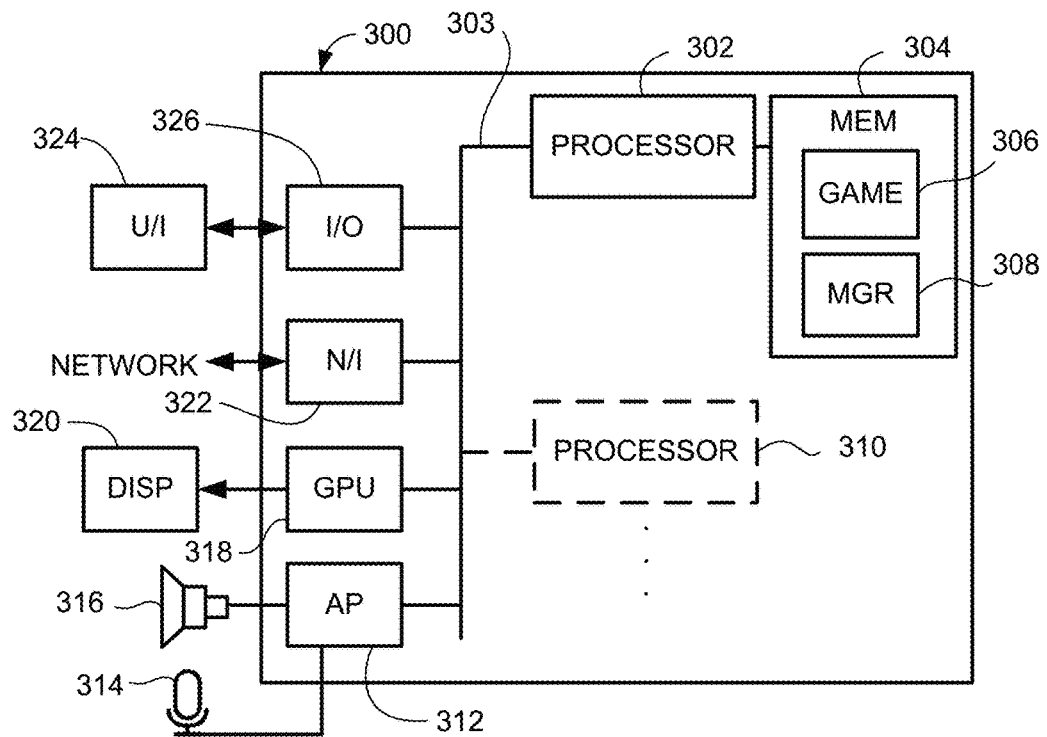
FIG. 3 is a block diagram of a client device suitable for using a flexible video game and interacting with a server for configuring the game.

FIG. 3 shows an example of a client device 300 suitable for interacting with a server (e.g., the server 200 described above) for enabling configuration of a video game after publication based on game parameters provided from the server 200 to the client 300, and for interacting with a server for providing some of the input data that drives the game configuration. The client device 300 may be, or may include, any one of the examples described above in connection with the client-server environment 100. The client device 300 may include, a single hardware or firmware processor 302 coupled to a memory 304 holding one or more functional modules 306, 308. In an alternative, the client device 300 may include multiple parallel processors 302, 310. Each processor is coupled to essential components of the client device 300, including at least the memory 304 holding functional components including at least a data logging component 306 and a client-server communication component 308.

Components of the client device 300 may be coupled to one another or to the one or more processors 302, 310 via an internal bus 303. The client device 300 may further include one or more input/output ports (e.g., USB or other serial port) each coupled to a user input device. A user input device may include, for example, a touchscreen interface, a keyboard or keypad, a pointing device (e.g., a computer mouse), an eye position sensor for a mixed reality client, a microphone (e.g., the depicted microphone 314), or other pointing device. It should be appreciated that user input devices may be coupled to the processor 302 or processor 310 via a non-serial interface, for example, a touchscreen may be coupled via a graphic processing unit 318 and a microphone 314 may be coupled via an audio processing unit 312. The user input devices convert physical actions by a user into an electrical signal that can be interpreted by a processor of the client 300 as a command or as data. Semantic meaning for the electrical signals may be supplied by any suitable user interface application, for example, a graphical user interface (GUI) application that generates a GUI for display by a display device 320, or an audible interface application that interprets speech or other audible signals pick up by the microphone 314. Semantic meaning may also be inferred from lower-level components, for example, operating systems and device drivers.

The client device 300 may further include one or more network interfaces 322 (e.g., an Ethernet, or wireless network interface controller (WNIC)) for communicating with servers or other nodes of an external network. The client device 300 may further include one or more graphic processing units 318 for supplying a video signal to a display device 320. A display device may include, for example, a computer monitor or television, a digital projector, a mobile device display, or a dedicated mixed reality display. The client device 300 may further include one or more audio processors 312 for driving, based on digital input from the processor 302 and/or 310, an audio output transducer 316 that generates audio (e.g., speech, music, or sound effects) for hearing by a user of the client device 300. An audio processor 312 may be configured to receive an audio signal 314 picked up by a microphone 314 and convert it to a digital signal for processing by the processor 301 and/or 310. The processor may use the digital audio input to discern spoken commands from a user of the client device 300, to detect or record ambient sounds for logging, or other use. In some embodiments, the client device 300 may lack any capabilities for graphical output and may interact with the user solely or primarily via an audio user interface.

In an aspect, the client device 300 may further include one or more sensors in addition to the microphone 314 that generate digital data indicative of a physical state or environment of the client device. The one or more sensors are coupled to the processor 302 and/or 310 and supply digital data that the processor or processors use to generate device level data using a logging module 306. For example, the processor 302 may receive sensor signals from the microphone 316, process the data by an algorithm or algorithms, and generate one or more processed data objects from the data. The class of processed data objects indicating a state or action of a client device independent of any higher-level application is device level data. Device level data reflect the physical state of the device; e.g., its location, orientation, temperature, ambient light environment, acceleration, memory use, processor use, both current and logged past data, whether or not relevant to other applications. Processed data objects may be numeric, textual, and/or otherwise symbolic, and recorded in a computer-readable symbol set, e.g., binary code or standard character set (e.g., ASCII, MAC OS, etc.). Processed data objects from sound may include, for example: a numeric ambient sound level, a sound type (e.g., speech, music, ambient office, ambient urban, ambient rural), sound frequency, sound amplitude, language of speech, number of speech or sound sources detected, and direction or speech or sound sources. For further example, the processor 302 may receive signals from a location, acceleration and/or orientation sensor, and generate one or more processed data objects from the location or orientation signals. Processed data objects from location or orientation data may include, for example, latitude and longitude, device orientation relative to an Earth frame of reference, linear velocity, linear acceleration, angular velocity, shock, and angular acceleration. For further example, the processor 302 may receive signals from an optical sensor and generate one or more processed data objects from the optical sensor signals. Processed data objects from optical signals may include, for example, an ambient light level, a rate of change in light level, a color temperature or hue, and rates in change of color temperature or hue. Other sensors may include a user input device, for example, a touchscreen or keypad. The processor may receive signals from user input devices 324 and generate one or more processed data objects from the user input device signals. Processed data objects from user interface signals may include, for example, touch event, frequency of touch events, and touch pressure. The processors 302 and/or 310 may log each of the foregoing processed data objects in the memory 304 and/or send the device level data thus collected to another data sink correlated to a time of day, day of the week, and/or date that the sensor data was received, based on an internal client clock (not shown) and/or a time signal received from a network node. These and other processed data objects may be included in device level data for any instance of the novel methods and apparatus described herein.

In an aspect, the memory 300 may further hold a communications/data module 308 that manages communications between the client device and one or more servers that perform functions as described herein. The communications/data module 308 uploads or otherwise provides logged data to one or more data servers. The module may cause device level data to be provided to the server in batch mode (e.g., at times when the client device is idle), or in real-time mode (e.g., as quickly as possible after generated by the client device 300, usually within one second or less), or in some combination of batch and real-time modes. For example, the communications/data module 308 may flag data as short-term or long-term, with short-term data uploaded to a system server in real-time mode and long-term data uploaded in batch mode. In addition, the communications/data module 308 may receive messages from a system server that have been selected using a machine-learning message selection process or apparatus as described herein.

In another aspect, the memory 300 may hold one or more end user applications, or components thereof. The end user applications may include, for example, a video game 306, a social networking application, a web browser, a mobile communications application, or a library manager. The communications/data module 308 may receive data or signals from one or more end user applications and generate one or more processed data objects based on the data or signals. Processed data objects from application signals or data may be referred to herein as "application level data." In other words, the class of processed data objects indicating a state or action of an application (in the sense of computer software) is application level data. Application level data may include, for example, states of application variables. In addition, application level data may be generated by system servers when the application is executed at least partly by one or more of such servers.

Application level data can include game play data for play of the subject video game 306 using the client device 300. Game play data is a species of application layer data relevant to video game applications. Game play data may include, for example, identification and descriptive information for player assets, including but not limited to avatars, tools or other in-game possessions, environments, and credits. Game play data may further include settings for user-perceivable aspects of game play, for example, relative powers and defenses of avatars and non-player characters in game play events; scoring and prize-awarding algorithms; algorithms for determining outcomes of contests; colors, tones, and textures of objects and scenes; sound effects, music, voice quality, volume, and other audio features; and pacing of computer-determined game action. Game play data may further include multi-player settings such as, for example, algorithms for matching players in game sessions and handicaps.

Figure 4:
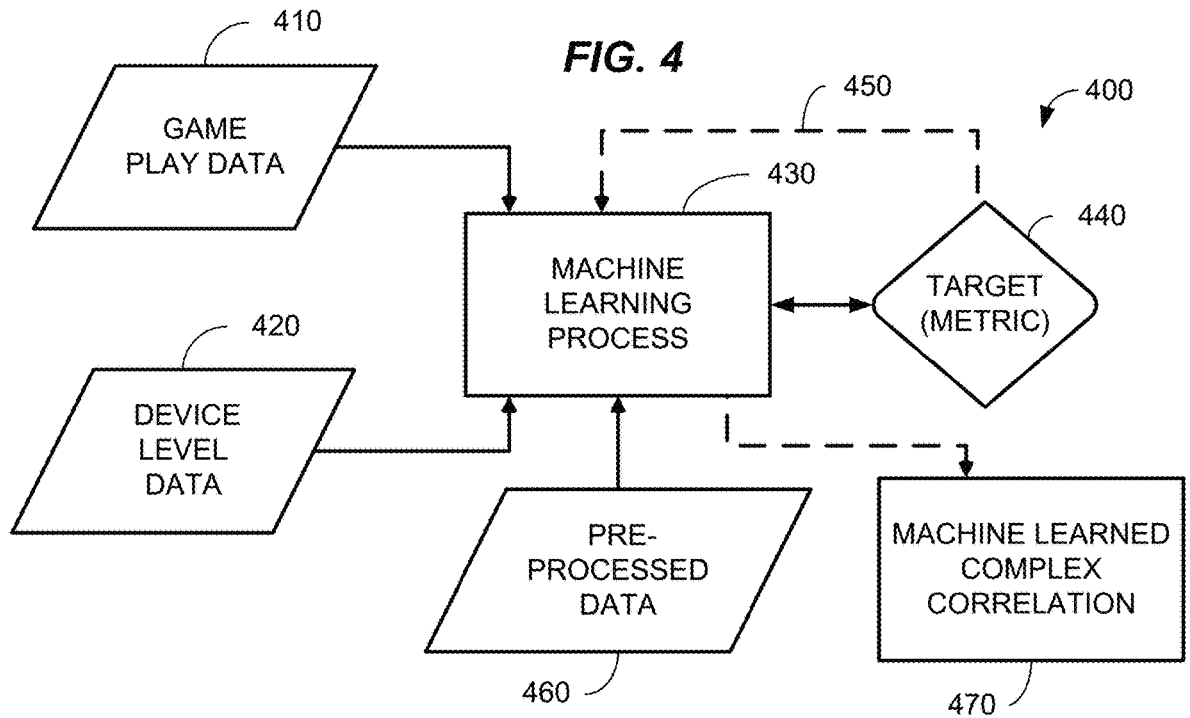
FIG. 4 is a high-level function diagram of a process or apparatus for developing a machine learned complex correlation of a result metric to input data useful for configuring a flexible computer game.

Game play data 410 may be used in real-time or batch mode as input to a high-level function 400 for developing from a machine learning process 430 a machine learned complex correlation 470 of a result metric 440 to input data useful for configuring a flexible computer game, as diagrammed in FIG. 4. The input data may include game play data 410 and device level data 420. The game play data 410 and the device level data 420 may be provided in real-time, as offline batch data, or both. In batch mode, the input data may include pre-processed data 460 indicating historical actions of users or devices or groups (cohorts) of users or devices, for example, prior purchases, browsing histories, and trends in group activity. During initial training of the machine learning process, all input data may be in batch mode. After initial training, the process 400 may be used during operation of a subject video game, in real-time or near real-time modes. Examples of real-time application of the process 400 are described in connection with FIGS. 8-10.

The function 400 may be performed by a system server. The machine learned complex correlation 470 may exist as an internal configuration of the machine learning process 430. As used herein, "machine learned complex correlation" means an aspect of a machine learning process resulting from training the process using one or more sets of training data with a target prediction, e.g., a likelihood of a desired consumer action or state. More specifically, for example, the function 400 may be performed by the machine learning module 208 of server 200 during a training process using sample data to derive an initial prediction module 208. The server may execute a separate instance of the function 400 for each different desired target 440. Likewise, a separate instance of the machine learning process 430 may be executed for training sets of different scope. In an aspect, the scope of the training set should match the scope of the input data 410, 420, 460. For example, if real time data consisting of 50 specific record types of device level data 420 and 100 specific record types of game play data 410 are anticipated, then the training set should consist of those same 50 and 100 record types. In addition, different machine learning algorithms may be used in different instances of the function 400, depending on the type of input data and desired target.

During the initial or a subsequent training process, the machine learning process 430 receives feedback 450 from a measurement function that compares an actual result (e.g., engagement of a user with a game) with observed results. The machine learning process 430 adjusts its internal parameters to minimize error between predicted and observed results, using computation methods known for the examples of machine learning algorithms disclosed herein.

Once the process 400 is trained on a sample set, it is ready to be used by a system server for a prediction function (e.g., in a prediction module 208) for the target for which trained. In real-time mode, the training set is replaced by real-time data, which may be of the same record types as the training set. Using the real-time data as input, the machine learning process 430 develops the complex correlation 470 between the set of input data and the target. The complex correlation can be used to estimate a likelihood that a specific user, client device, user cohort, or client device cohort will respond as desired (i.e, will achieve the target 440) based on a real-time data set collected for a most current period (e.g., the most current second, minute, day, or hour). Actual results may be measured and fed back 450 to the induction process 430, so that training is continual and the induction process 430 can evolve with changing conditions. It should be appreciated that a machine learned complex correlation may be further refined while it is also being applied to make a prediction.

The function 400 includes a process 430, which includes machine learning and other computational elements, receiving as input personally identifiable game play data 410 from client devices and personally identifiable device level data 420 from client devices or web applications serving client devices or identified users. Further description of the input data 410, 420 is provided in connection with FIG. 3 above and FIG. 5 below. The process 430 uses machine learning and programmed tools in stages, operating on the input data to map inputs to predictions that apply in one or more "real time" contexts. The prediction 440 concerns the propensity of an identified person or client to conform to the target metric in a real time context. Any other system-measurable target may be specified, in the alternative. The time constraints for "real-time" may vary based on a defined cycle of the targeted metric 440. For example, if the process 400 is set up to determine the complex correlation 470 between the input parameters 410, 420 and a user response within 15 minutes, then the limit for real-time performance is 15 minutes. Longer or shorter periods for real time response may be defined up to a maximum time when predictable causation between the input data 410, 420 and the target 440 can no longer be detected by the machine learning process. Detection is not possible when there is no causal chain between input data 410, 420 and the target 440. When there is no causal chain, the machine learned complex correlation will have no predictive value. Thus, the presence of a causal chain and the usefulness of the complex correlation 470 can be uncovered by empirical testing of predictions made based on a learned complex correlation 470.

Predictions of consumer behavior are a useful purpose for operating the process 400, but do not by themselves enable configuration of a video game after it is published to achieve some objective, e.g., greater consumer engagement. The predictions achievable using the process 400 cannot directly predict which changes in video game parameters will result improvement in the targeted metric 440, because video game parameters are not part of the input data. Different computational steps are needed to obtain information that informs design choices for changing video game parameters automatically.

Figure 5:
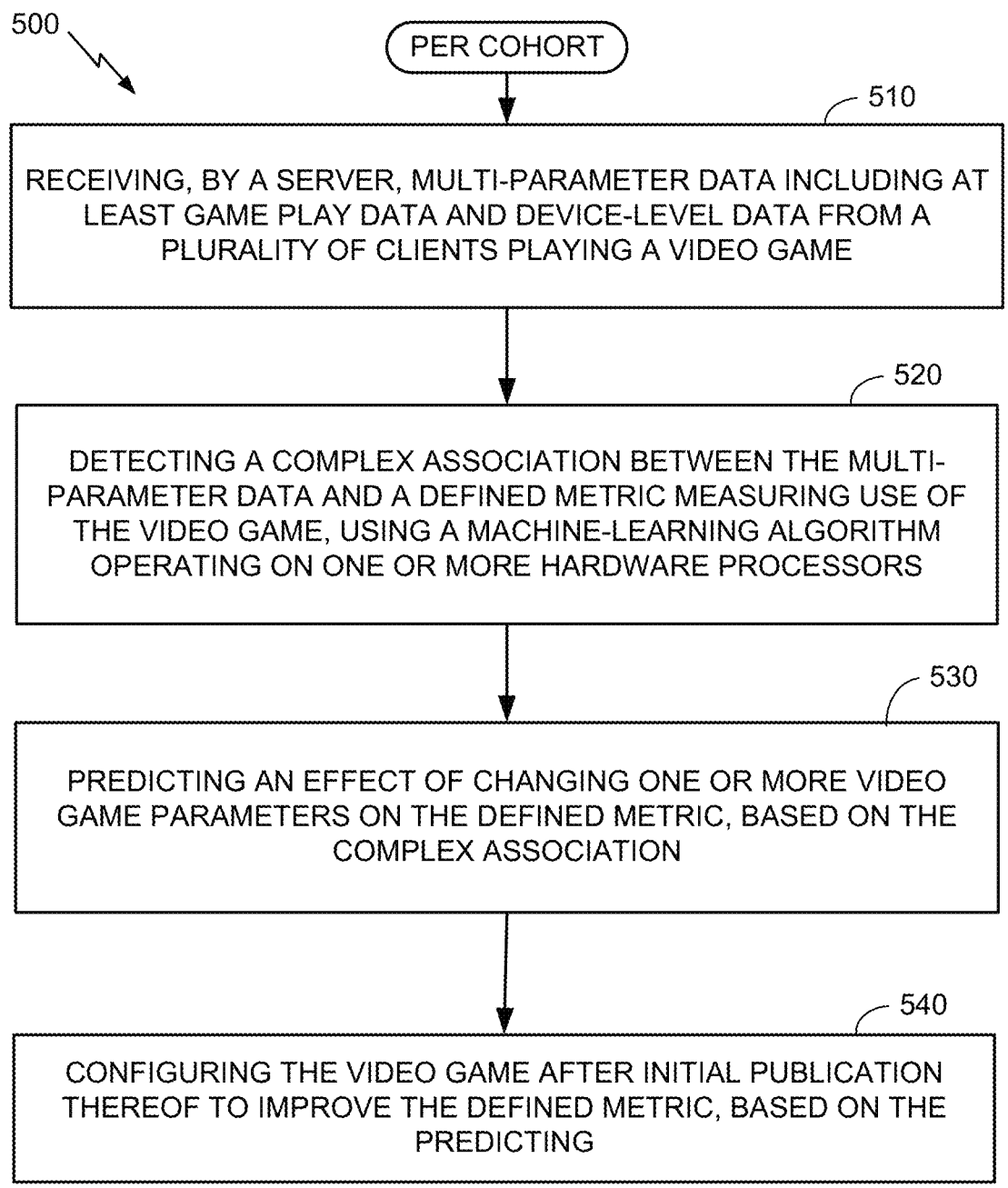
FIG. 5 is a flow chart illustrating a method for configuring a flexible computer game, based on a machine-learned correlation of a result metric to input data.

Before considering details of additional computational steps, we will discuss an overview of a computer-implemented method 500 for configuring a flexible video game, summarized in FIG. 5. The method 500 may include additional details as described in connection with subsequent figures. As summarized in FIG. 5, the method 500 can be performed separately for each cohort of users or devices for which it is desired to configure video game parameters. For example, the method 500 can be performed for a single user, or for a group of users selected based on shared demographic or geographic parameters. In an alternative, or in addition, the method 500 can be performed for a single client device based on a device identifier, or more likely, for a group of client devices that share device or connection characteristics (e.g., screen size or available bandwidth).

The method 500 may be performed by one or more processors for example, any one or more of the servers 116, 122, 124, or 126 shown in FIG. 1. Referring again to FIG. 5, the method 500 may include at 510, receiving, by one or more processors, multi-parameter data including at least game play data and device-level data from a plurality of clients playing a video game. Examples of game play data and device level data are provided in connection with FIG. 3-4. The multi-parameter data is empirical, collected from client devices and applications in use by independent users. In an aspect, the method 500 may further include associating records of the multi-parameter data with individual users, based on sources of the records.

The method 500 may further include, at 520, detecting a complex association between the multi-parameter data and a defined metric measuring use of the video game, using a machine-learning algorithm operating on one or more hardware processors. Block 520 summarizes the process 400 described in connection with FIG. 4, with the proviso that the targeted metric 440 is a measure of use of a video game by one or more users or client devices. Examples of such measures may include frequency of play, time of play, time since last play, frequency of in-game purchases, time since last purchase, number of users playing, retention periods, and so forth.

Detecting the complex association may include executing at least one supervised machine learning (SML) algorithm, for example, one or more of a linear regression algorithm, a neural network algorithm, a support vector algorithm, a naïve Bayes algorithm, a linear classification module or a random forest algorithm. The detecting the complex association 520 may include executing the supervised machine learning algorithm correlating input parameters in the multi-parameter data with the defined metric. In an aspect, the input parameters may include one or more of play parameters for the video game, use parameters for the client device, and state parameters for the client device. The play parameters may include, for example, one or more of each player's game scores, rate of user input, rate of game progress, average time of play, frequency of play, player avatar parameters, avatar accessory parameters, virtual inventory, purchase history, type of client device, game level, campaigns completed, inter-player relationships; avatar-NPC relationships, or any combination of the foregoing. The use parameters may include, for example, cookie values, browser history, media library content, executable applications installed, times of use, pattern of use, contact list, or any combination of the foregoing. The state parameters may include, for example, geographic location, network location, location history, hardware configuration, orientation, ambient light level, model identifier, operating system version, battery charge level, ambient sound level, velocity, acceleration, memory resources used, current connection capacity, current unused connection capacity, active applications, or any combination of the foregoing. The defined metric for the SML algorithm may be, or may include, a retention period, an incidence of use, a purchase measure, an ancillary purchase measure, or other measure of interest pertaining to engagement with the video game.

The method 500 may further include, at 530, predicting an effect of changing one or more video game parameters on the defined metric, based on the complex association. The operation 530 may be executed by a programmed algorithm that uses at least one complex association from the preceding operation 520. Optionally, the predicting 530 may make use of a machine learning process as used in the preceding operation 520 but with a different target and input data or may use a different machine learning process. The predicting 530 describes an algorithmic, machine implemented process. "Predicting" means making a quantitative estimate describing a statistical likelihood or equivalent measure that changes in the video game parameters will achieve the defined metric targeted in the preceding operation 520. More detailed aspect of the predicting may be as described below in connection with FIGS. 8-11. For example, predicting the effect of changing one or more video game parameters may include producing a predicted set of the input parameters by transforming an actual set of the input parameters based on changes in the one or more video game parameter, and executing the SML algorithm using the predicted set as input The method 500 may further include, at 540, configuring the video game after initial publication thereof to improve the defined metric, based on the predicting. For example, suppose the operation 530 resulted in a prediction that changing the color of an in-game character from blue to red will cause a 1% increase in frequency of in-game purchases. The configuring 540 can be used to color the in-game character red, using machine-implemented techniques as described below in connection with FIGS. 12 and 13. The configuring operation 540 may be executed automatically by one or more machines. An administrative operation may be interposed between the configuring operation 540 and the preceding predicting operation 530. For example, the predicting operation may output data describing one or more configuration changes and a predicted effect for each change. A human administrator may review the output and select one or more changes for implementation. The selected changes may then be machine implemented in the operation 540. In an alternative, configuration changes may be selected automatically, without human intervention. In another aspect, configuring the video game 540 may include changing one or more parameters designated as configurable of the video game parameters without changing one or more parameters designated as not configurable of the video game parameters.

Figure 6:
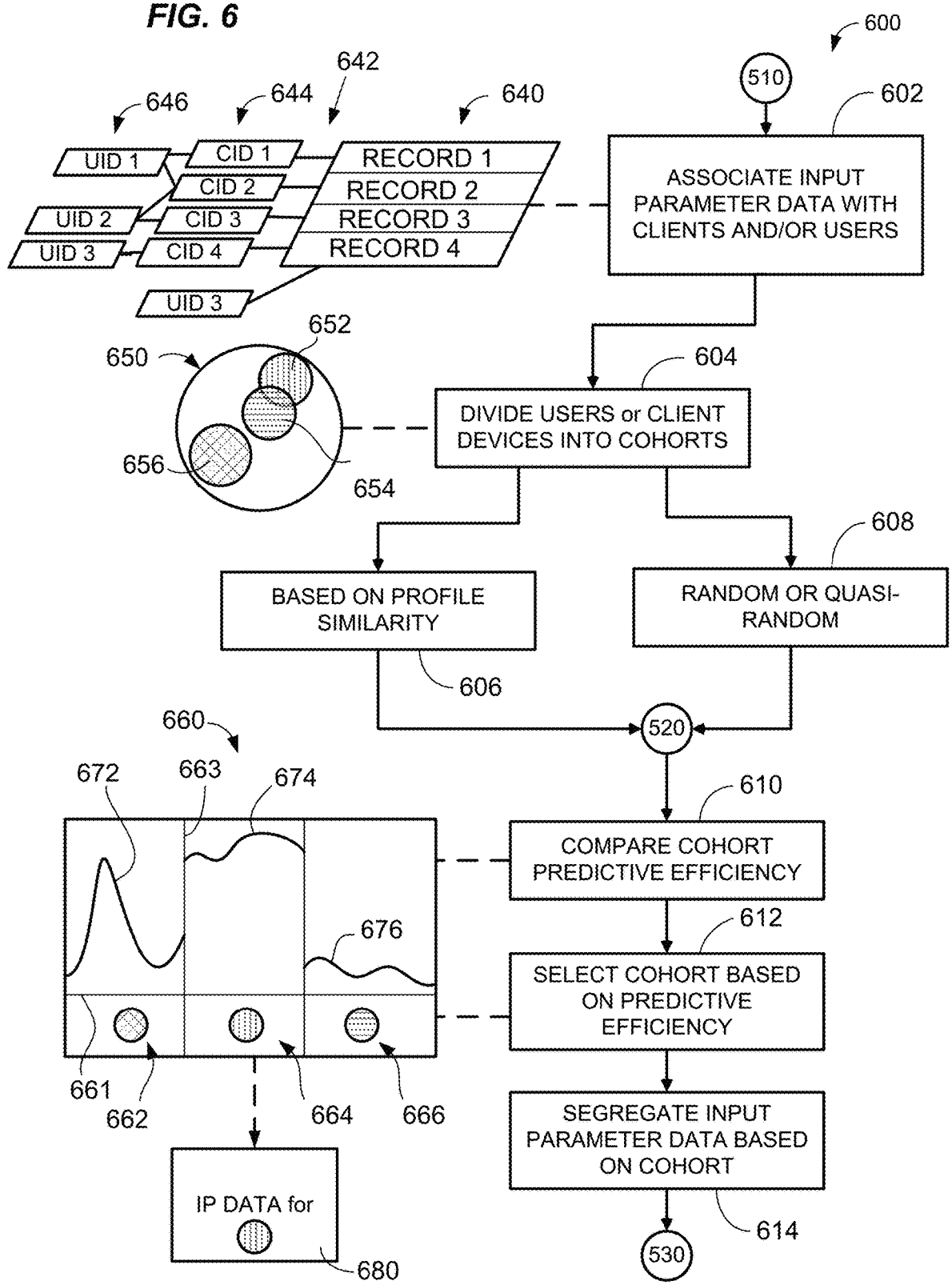
FIG. 6 is a conceptual block diagram illustrating components of an apparatus or system for performing a method as shown in FIG. 5 with division of users or client devices into cohorts.

FIG. 6 shows further operations 600 for making use of cohort information in predicting the effect of changes to video game parameters. The operations 600 may be useful for targeting changes in video game parameters towards narrower groups of users or devices, and so the operations 600 may sometimes be included in the method 500 beginning with operation 510 (receiving input data). At 602, the server receiving the data may associate records 640 of the input parameter data with one or more client identifiers 644 or user identifiers 646. Identifiers may be, or may include, unique data such as a serial number, index number, or digital code. Each record of input data originates in a client device, so usually associating the client identifiers 644 to received records 640 may be done by creating one-to-one relationships 642 in a database or other data structure. Each client device may be used by more than one user, so one-to-one or many-to-one relationships may be used to associate user identifiers 646 to client identifiers 644 and thus, to records 640. In addition, some input data (e.g., game play data) may be generated by an application registered to one or more users and protected by a secure login. Hence, the server may link game play data and other application data directly to a record without any client device intermediary.

At 604, the method 500 may include dividing the user group into cohorts. At 606, the dividing may be based, for example, on at least one of similarity in demographic profile, psychographic profile, and affinities known for different users, or technical device characteristics for different client devices. For example, an entire user or client device group 650 may be divided into smaller cohorts 652, 654, and 656, which in the illustrated example do not consume the whole cohort 650. Cohorts may be overlapping or non-overlapping. The whole cohort overlaps all constituent cohorts 652, 654, and 656. Constituent cohorts 652 and 654 overlap one another, but not cohort 656, for example. At 608, the dividing into cohorts may be based at least in part based on random selection or quasi-random selection. Whether random 608 or semantic 606 division is used, and reverting to the operation 520, the method 500 may further include detecting the complex association separately for each of the cohorts and selecting one or more of the cohorts at least in part based on utility of the complex association for the predicting. Likewise, the server may perform configuring of the video game parameters 540 separately for each of the cohorts, or separately for each of the individual users.

The complex correlation process 520 results in a complex correlation of multiple input classes to a targeted metric. In some embodiments, the process 520 is run for a cohort defined based on profile similarity and the result is used for video game configuration. In other embodiments, the server runs multiple processes 520 one for each cohort, and at 610 compares results, thereby identifying and selecting 612 cohorts with superior predictive efficiency. When repeated for each cohort, the process 520 provides multiple complex correlations 660, represented in simplified form as two dimensional graphs 662, 664, 666. Each input parameter ranges over multiple values. Different input parameters are represented equally spaced on the horizontal axis 661 and an output of a correlation function (e.g., a correlation coefficient) for each parameter over the range of values in the input to the targeted metric is plotted on the vertical axis 663. Although the function outputs 672, 663, 676 are depicted as continuous curves, it should be appreciated that raw data will appear as a scatter plot which can be fitted to a curve if desired. Moreover, the shape of the fitted curve will depend on the order in which the parameters are arranged on the horizontal axis, and so is arbitrary. The illustrative examples for complex correlations 660 depict imaginary fitted curves for a fixed parameter order. A higher value on the vertical axis indicates a higher correlation for values of the parameter to the metric indicated at that point in the graph, when all other parameters are held constant and the complex correlation function derived by the process 520 is applied to a range of values for the parameter being measured. The curve 672 represents values of the correlation function for all the parameters measured individually in cohort 656. Similarly, the middle curve 674 indicates correlation values for another cohort 652, and the right-most curve 676 indicates correlation values for the third cohort 654. Predictive efficiency may be defined as the area under the curves 672, 674, 676, so in this example cohort 652 may be selected 612 as having the highest predictive efficiency over the entire set of input parameters. However, the first cohort 656 shows high correlation for some parameter values, and this may also be useful. The foregoing algorithm is merely an example. Other methods for measuring the predictive efficiency of a cohort may also be suitable.

At 614, the server may segregate input data based on membership in the cohort, for example, discarding input from client devices or users outside of the cohort. The server may provide input data 680 for the selected cohort to the process 530 of method 500, for predicting the effect of making changes in video game parameters.

Figure 7:
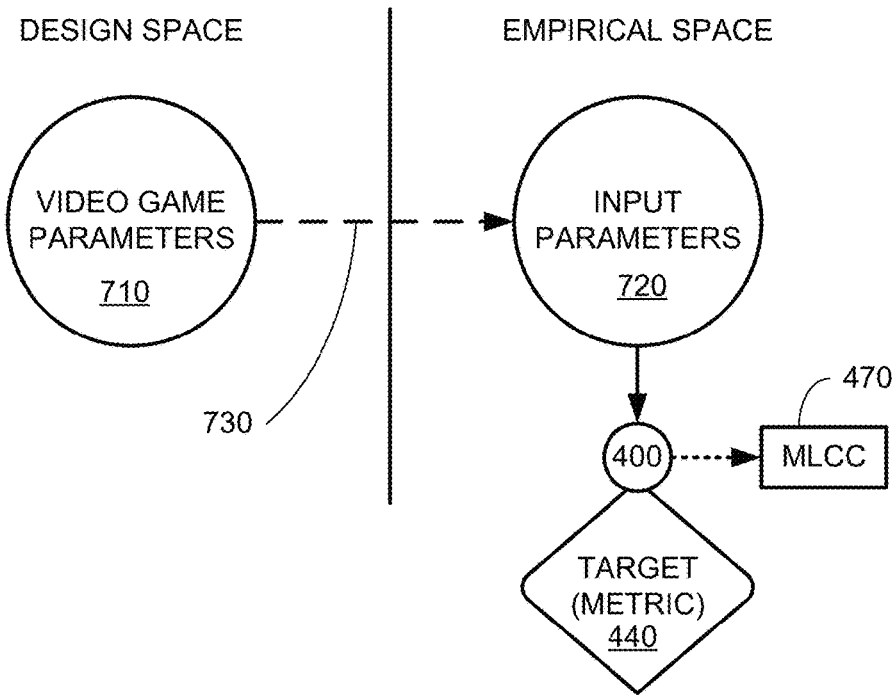
FIG. 7 is a concept diagram illustrating relationship aspects of input parameters and video game parameters in respect of the process or apparatus shown in FIG. 4.

Referring to FIG. 7, the system 700 illustrates a distinction between video game parameters 710 and input parameters 720. The process 400 is only capable of discovering the machine learned complex correlation (MLCC) 470 between the target metric and the input parameters 720. The process 400 is limited to discovering correlations between empirical data and a metric that exist but that humans are not capable of perceiving without application of a machine learning algorithm. The process 400 cannot find any correlations between design parameters inputs and a target where no empirical data exists. Accordingly, induction methods as described below, or similar methods, may be used for accomplishing the prediction operation 530 of method 500. These methods enable a computer to infer a relationship 730 between video game parameters 710 in a design space and input parameters 720 in an empirical space.

Figure 8:
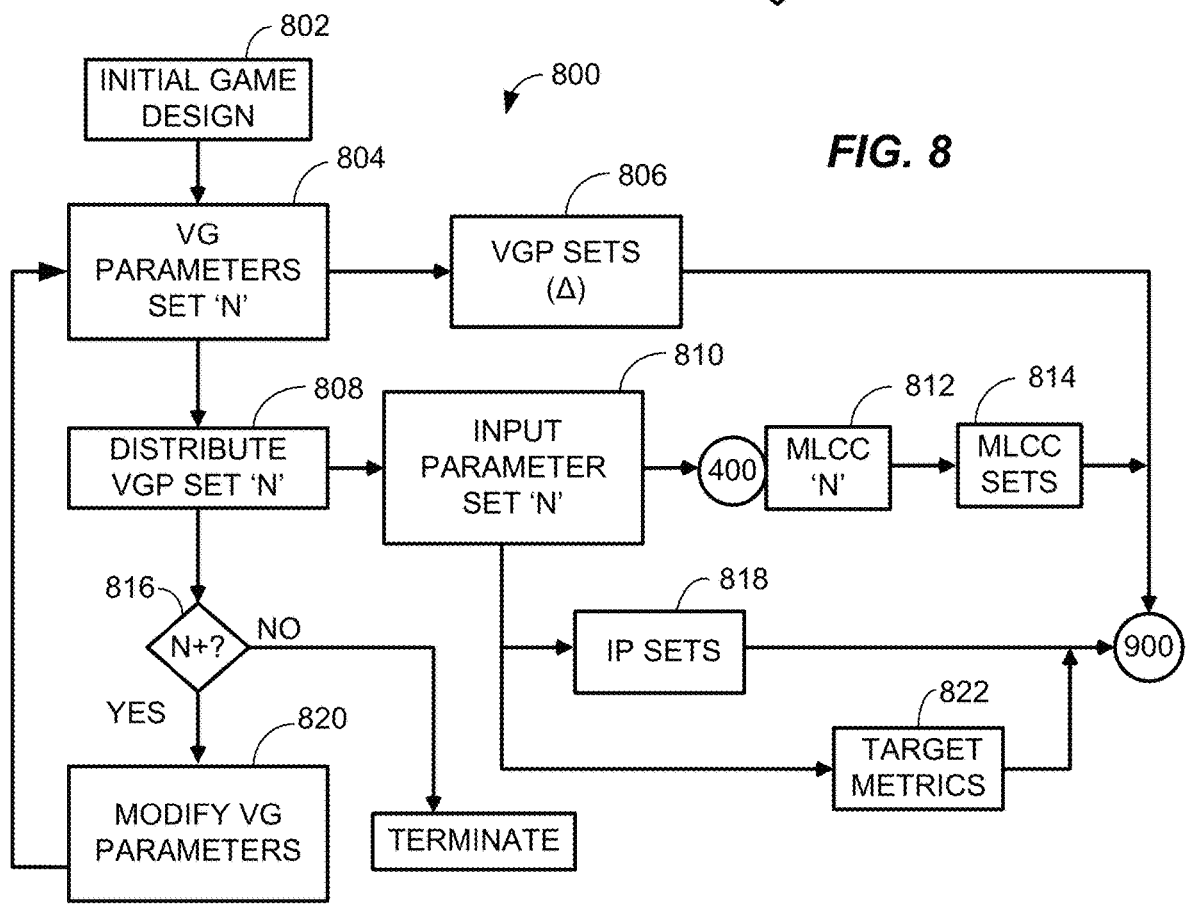
FIGS. 8-11 are flow diagrams illustrating aspects of predicting effects of a change of video game parameters on a target metric for use in a method as shown in FIG. 5, including operations for execution by a processor and related data objects.

FIG. 8 shows an initial process loop 800 of a method for predicting an effect of changing one or more video game parameters on the defined metric, based on a complex association. In summary, the method when executed by one or more processors generates a machine learned complex correlation between a set of design parameters varying over some delta (Δ) and a set of empirical measurements of the target metric that are correlated to input parameters using timestamps and client or user identifiers and to the targeted metric using a machine learning process. It may aloes be possible to interpolates between target values using observed correlations between input parameters and design parameters. The method can make use of data from repeated instances of the machine learning process 400 adapted to incorporate varying video game parameters. The method requires empirical data generated from varying video game parameters over a test sample.

At 802, a game is designed including configuring at 804 an initial set (N=1) of video game parameters (VGPs) for initial release as a software package including executable code and data. At 806, the server records the initial VGP set in a computer memory for use in a subsequent portion 900 of the method. Optionally, the initial VGP set is used as a baseline for additional VGP sets to be published later.

At 808, a server publishes the video game with the initial set of parameter values to a group of users, e.g., beta testers or any other cohort, referred to as the "selected cohort." At 810, the server collects an input parameter set from use of the video game by the selected cohort. The input parameters may be as previously described for the process 400. The server records and correlates the input parameter set to the initial set of parameter values involved in the same iteration of loop 800. In subsequent iterations of the methods, the server records and correlates each input parameter (IP) set 'N' to its counterpart VGP set 'N'. The processes 800, 900 may be repeated for as many different cohorts as desired.

The operations 812-814 relate in each iteration of the process loop 800 to input parameters for a single set of VGPs and may be omitted in some embodiments. At 812, the server operates the process 400 yielding a machine learned complex correlation (MLCC) between the IP set 'N' and the target metric used on process 400. The server likewise records and correlates the MLCC set 'N' to IP set 'N' and to VGP set 'N'. Through repeated iterations of the process loop 800, the server builds up a data store of MLCC sets, at 814. Any one or more of the MLCC sets may later be compared to one or more MLCC sets produced by operations 900 to better understand separate impacts of changing input parameters as compared to both video game parameters and input parameters. Further, it may be possible to estimate an independent effect of changing video game parameters from such comparisons, or to derive relationships between changes in video game parameters and changes in other input parameters. Information regarding such independent effects and relationships may be useful in predicting effect of changing video game parameters on a target metric. It should be appreciated that an MLCC set may include both executable code and data. The process 400 referenced at 812 uses a constant target metric through iterations of the process loop 800.

For each set of input values, the server measures or obtains a measurement of a corresponding value of the targeted metric. The server may collect the measurements in a computer memory as a set of target metrics 822 for each input and VGP parameters 'N'. The server may correlate each measurement to the input parameters using a timestamp or other cycle indicator shared by the measurements and input parameters.

At 818, the server provides the IP sets for processing by operations 900, correlated to corresponding one or more VGP sets 806 by the iteration number 'N'. At 822, the server similarly provides the measured target metrics 822. It should be appreciated that the operations 900 may be performed in parallel with the processing loop 800. If so, input parameters 818 and metrics 822 may be provided for further processing using operations 900 as soon as received and each change in video game parameters may be provided at the onset of each iteration 'N'. In the alternative, or in addition, the VGP sets 806, metrics 822 and IP sets 818 may be provided to the subsequent process 900 in batch mode. The server may provide the sets by writing to a shared memory location known to a processor of the process 900, by transmission to a separate processing node, or by any other suitable method.

At 816, the server determines whether an additional iteration is desired. This decision may depend on expiration of an allotted time for the process 800, by comparing a range of different VGPs processed to a desired range of different VGPs, by a numerical limit, or any combination of the foregoing. For each new iteration, at 820 the server modifies the VGP parameters within one or more domains of parameter values the system operator will explore.

Figure 9:
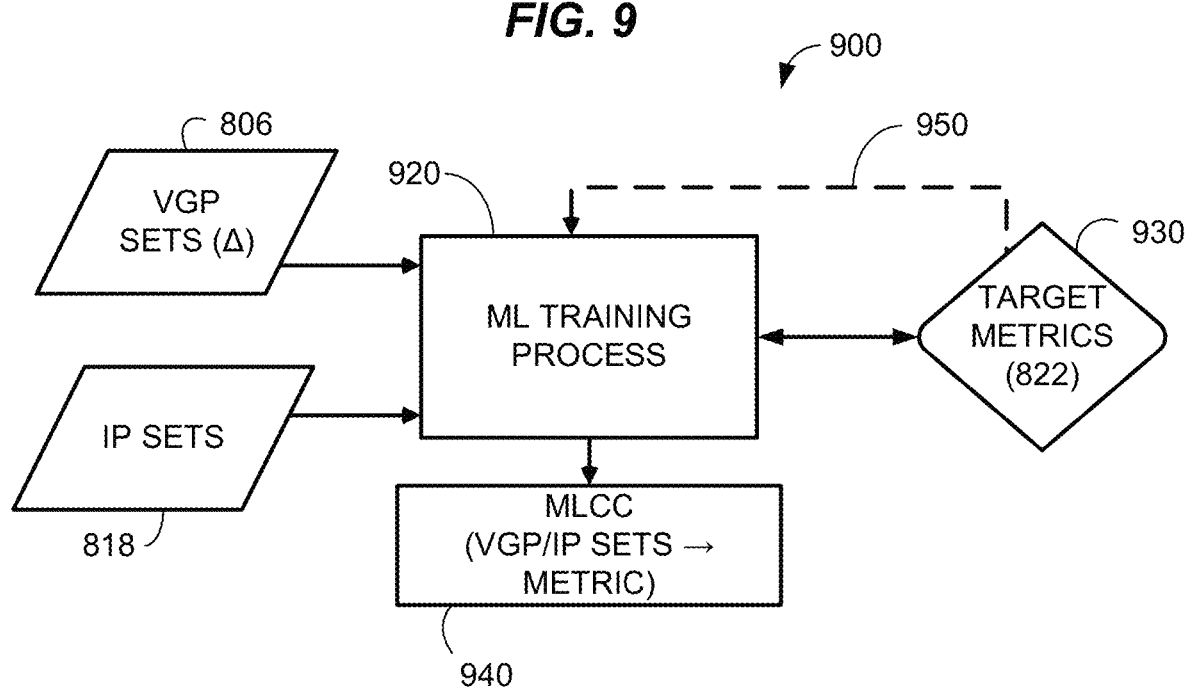

Referring to FIG. 9, the process 900 resembles the earlier process 400, and more detailed aspects of the process 900 may be as described for process 400 herein above, subject to distinctions flowing from the preceding process loop 800. The server provides the VGP sets 806 correlated by process 800 iteration to other empirical input data 818 as input to the machine learning training process 920. The input data 818 may be filtered or processed as desired, for example, may be simplified or reduced in size, before inputting to the machine learning process 920. Simplification may proceed as far as eliminating the IP sets entirely. However, removing any input parameter also removes the possibility of uncovering interplay between the removed parameter and the metric through application of machine learning. In an aspect, the process 900 may be iterated using different selections of input parameters with the same varying video game parameters, and the resulting machine learned complex correlations compared. The process 900 may run in parallel with the iterative process 800 that provides varying VGP values correlated to empirical input.

The server provides feedback 950 including a measurement of achievement of an empirical target 930, for example the measurements 822 corresponding to particular VGP 806 and IP 818 values. The target 930 may be any suitable target for the video game producer/distributor, for example targets as previously described in connection with the process 400. The feedback 950 may indicate a quantity of variance between a targeted and measured values or may comprise any other transformation of a measured value for particular combinations of input values and video game values, including but not limited to an identity transformation (multiplication by one), a difference, a percentage or other proportion, a derivative, an integral, or combinations of the foregoing. The machine learning training process 920 produces a machine learned complex correlation 940 between the inputs 806, 818 and the targeted metric 930. The MLCC 940, alone or in combination with companion MLCCs produced by iterating the process 900 with different subsets of input parameters 818, may be applied in the method 500 as described in connection with FIG. 11, for predicting the effect of a change in VGP parameters on a target metric. The MLCC 940 thus can be used to predict the effect of a change in video game parameters by applying the MLCC to different combinations of VGPs and IPs within the scope of its training set.

Figure 10:
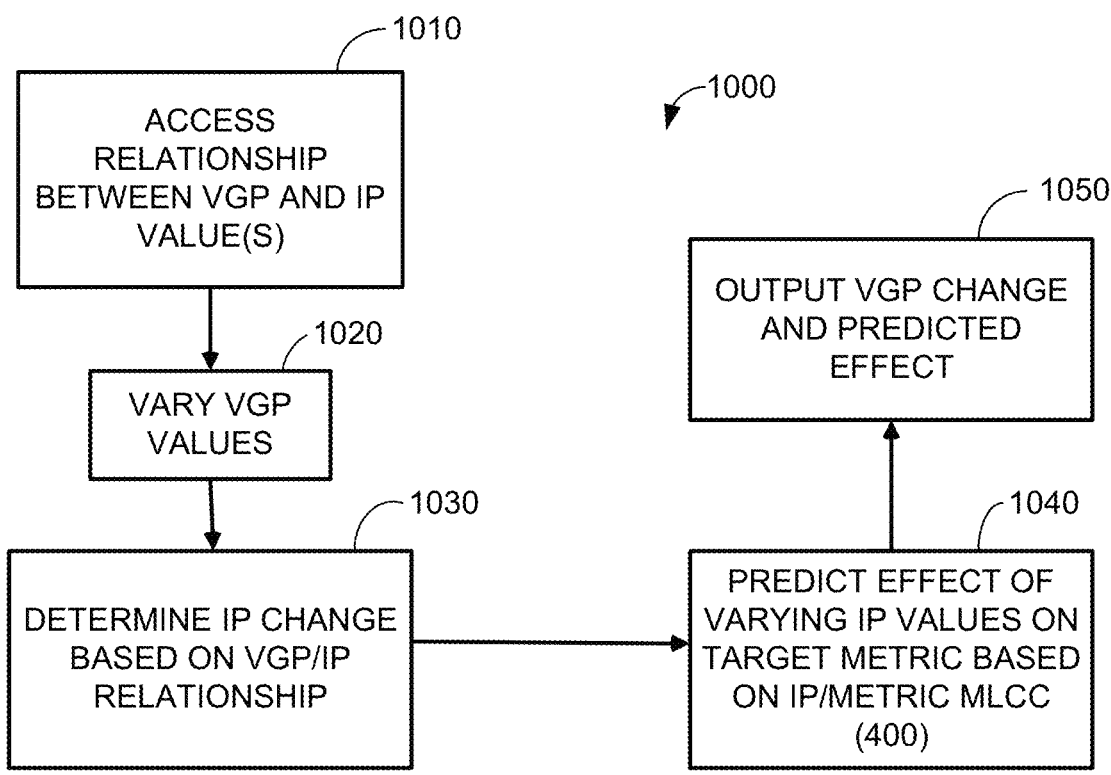

Before describing application in the method 500, FIG. 10 illustrates an alternative method 1000 for predicting an effect of a change in video game parameters on a targeted metric, in special circumstances where it is possible to identify a predictable effect (i.e., a cause and effect relationship) of varying one or more video game parameters on one or more empirical input parameters. For example, it might be observed from trial and error that changing the rate of a game operation causes a predictable effect on signaling rates from keyboards or other user interface devices. Accordingly, at 1010, a processor accesses a predetermined relationship between at least one VGP and at least one IP that has been defined as a machine-readable expression of some kind by an automated or semi-automated relationship manager. At 1020, the processor selects a desired variation of a VGP value for which it possesses a predetermined relationship. At 1030, the processor determines (i.e., predicts) a corresponding change in input parameters based on the known VGP/IP relationship. At 1040, the processor predicts an effect of varying the input parameters as predicted at 1030 on a targeted metric, based on a machine learned complex correlation (MLCC) for the predicted changed input parameters with or without additional input parameters in other classes. The MLCC may be developed using a process 400 as described in connection with FIG. 4. At 1050, the processor outputs the change in VGPs and predicted effect for use in process operations 1100 as described in connection with FIG. 11.

Figure 11:
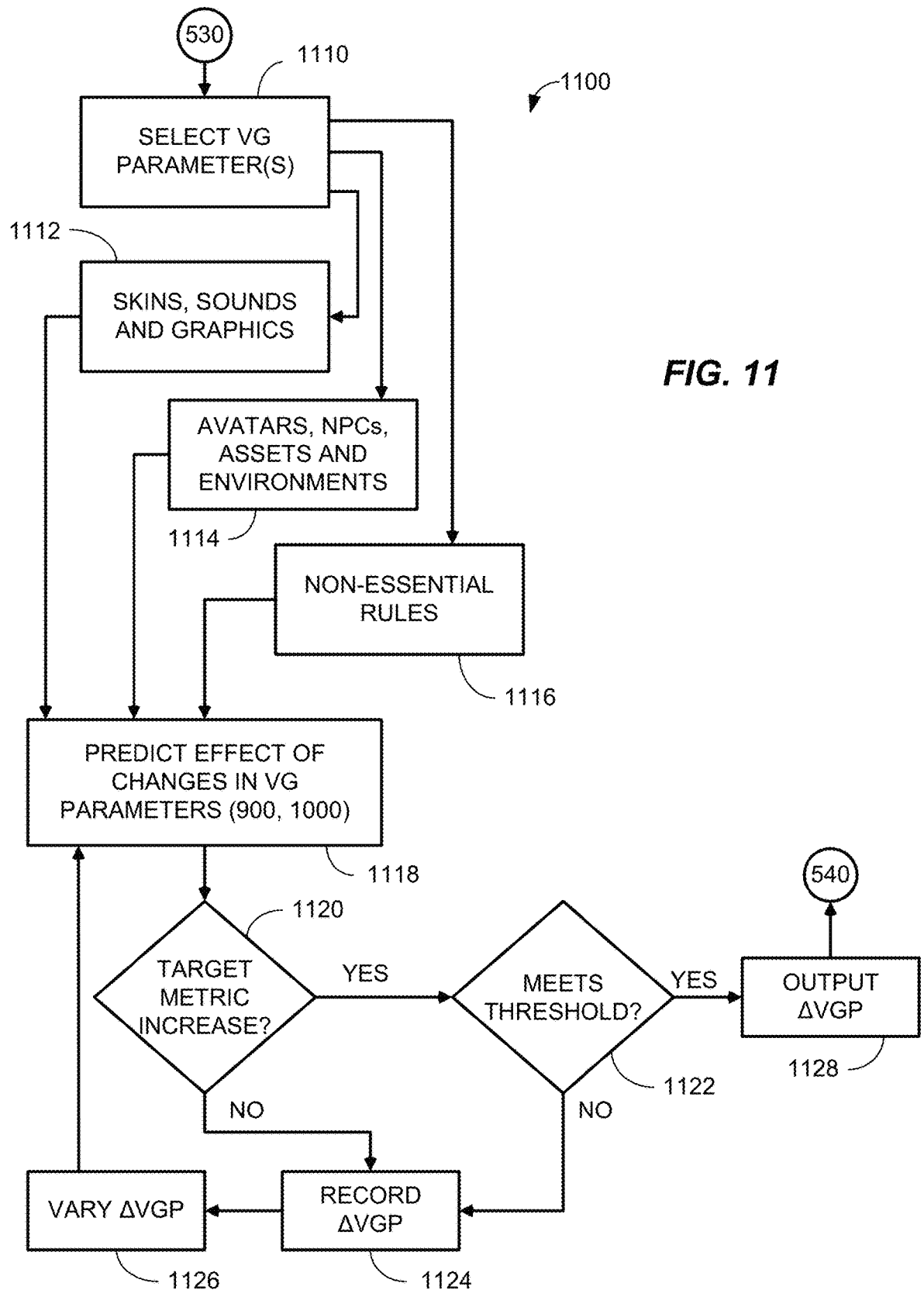

FIG. 11 shows additional operations 1100 that may be applied in a method 500 as described in connection with FIG. 5, for the operation 530 of predicting an effect of changing one or more video game parameters on the defined metric, based on a complex association. At 1110, a processor selects one or more video game parameters to be changed. The video game parameters to be changed may include, for example, skins, sounds and graphics 1112, avatars, NPCs, assets and environments 1114, and non-essential rules 1116. The non-essential rules 1116 may be a smaller subset of the entire set of operating rules for the video game, that are designated by the game designer as being changeable. Likewise, the parameters 112 and 114 may not include every possible parameter of the described type and may be limited only to parameters designated as automatically changeable using a data flag or other indicator.

At 1118, the processor predicts an effect of making a prospective change in the selected VG parameters. To make the prediction 1118, the processor may use a process 900 or 1000 as previously described, or any other suitable method based on a machine learned complex correlation between the input parameters and/or video game parameters and a targeted metric. At 1120, the processor determines whether an increase in the sense of a desired change or improvement in the targeted metric is predicted. If an increase is detected, at 1122 the processor may determine whether the increase meets a minimum threshold for improvement. If the threshold is met or exceeded, at 1128 the processor may supply the prospective change in the VGP for use in the method 500 at 540. If the threshold is not met or exceeded, at 1124 the processor may record the prospective change in the VGP as a deprecated prospect with its predicted effect. At 1126, the processor may develop a further change in the same VG parameter, and revert to box 1118, optionally by interpolating from any records of prior experiments. In the alternative, the processor may revert to box 1110 and select a different VGP for alteration. The operations 1100 may be performed for one VGP at a time, or for multiple VGPs.

FIGS. 12 and 13 illustrate alternative operations 1200, 1300 for configuring a video game after initial publication to improve a defined metric, based on machine learning-based predictions (i.e., different ways of implementing the operation 540 of method 500). Referring to FIG. 12, alternative operations 1200 apply to implementations in which video game parameters are called from a data store by a game engine at runtime. At 1210 the server may maintain video game parameters in a client accessible memory. Client accessible memories may include, for example, memory on the client device itself or memory in a server that is accessible by the client device. The client accessible memory should be easily accessed by both server and by client devices in use by the relevant cohort. At 1220, the server may update the video game parameters in the client accessible memory, to conform to one or more recommended changes in the video game parameters such as may be output by operations 1100, or similar procedures. At 1230, the server may provide an alert to clients in the relevant cohort that updated video game parameters are available. In some embodiments, the alert may include pushing the updated parameters to a memory location used by the client devices for game play, so that that updated parameters are automatically used in the next game session. In other embodiments, the server sends a signal to the client devices that informs the user and/or version manager application on the client that an update is available. In those embodiments, at 1240 client devices in the cohort act to download or otherwise access the updated parameters, automatically or by choice of their users. The updated parameters may be restricted to client devices or users in the cohort or may also be provided to devices or users in other cohorts.

Referring to FIG. 13, alternative operations 1300 apply to implementations in which video game parameters are compiled into executable code or written into embedded scripts of a game engine. At 1310, the server may update the video game parameters in revised source code or in revised callable scripts. At 1320, for compiled source code only, the server creates executable code by compiling the revised source code. At 1330, the server places the compiled code or revised script in a client-accessible memory as described for operations 1200. At 1340, the server alerts client devices in the cohort that updated executable code or script is available, as also described for operations 1200. At 1350, client devices in the cohort act to download or otherwise access the updated executable code or script, automatically or by choice of their users. The updated code or script may be restricted to client devices or users in the cohort or may be provided to devices or users in other cohorts.

Figure 14:
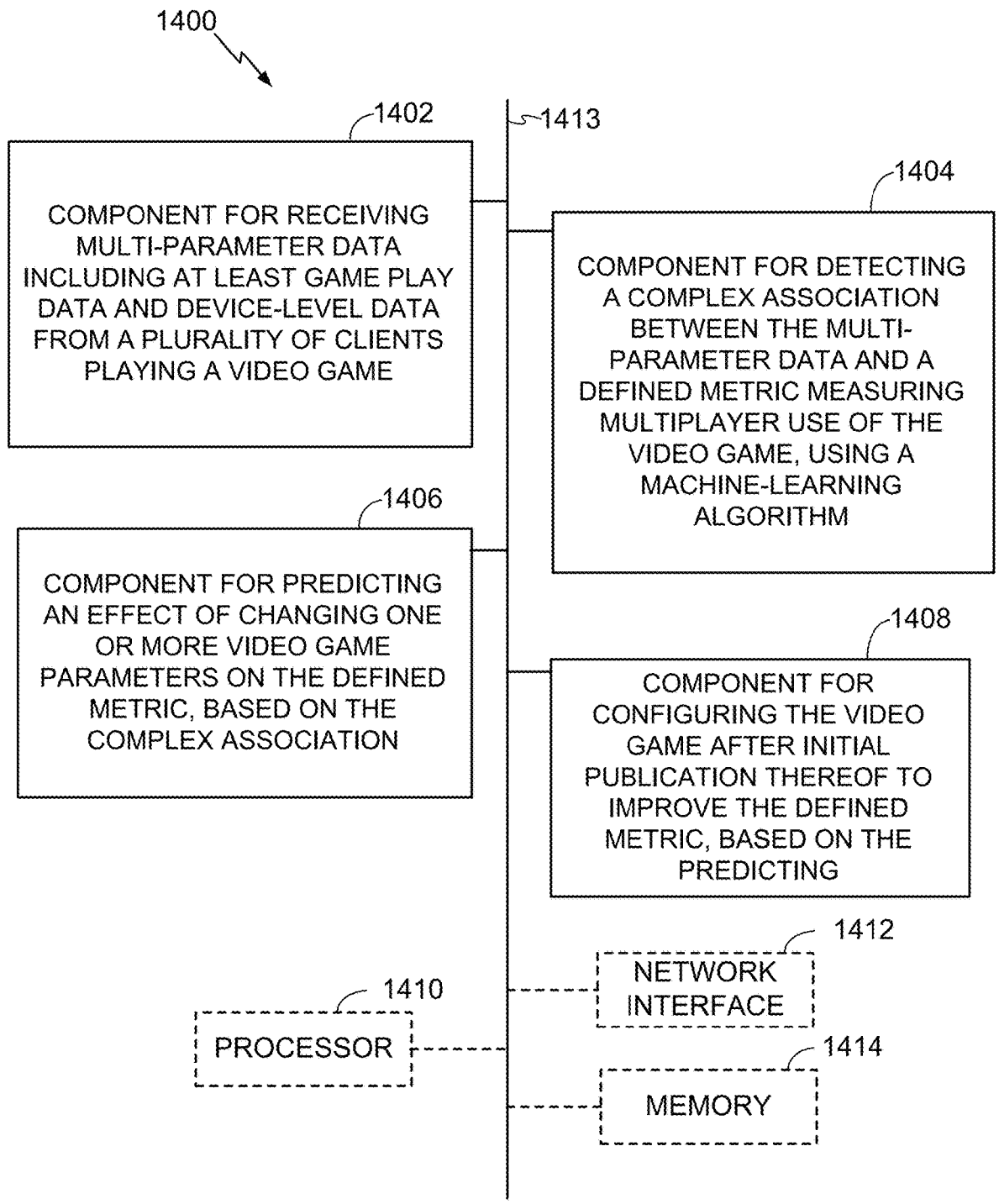
FIG. 14 is a block diagram illustrating aspects of a machine or apparatus for performing a method as shown in FIG. 5, with or without more detailed aspects or operations as described in connection with FIGS. 9-13.

In accordance with the foregoing Figures and accompanying disclosure, FIG. 14 is a conceptual block diagram illustrating components of an apparatus or system 1400 for configuring a flexible video game. The apparatus or system 1400 may include additional or more detailed components for performing functions or process operations as described herein. For example, the processor 1410 and memory 1414 may contain an instantiation of any operable combination of the processes 400, 500, 600, 800, 900, 1000, 1100, 1200 or 1300. As depicted, the apparatus or system 1400 may include functional blocks that can represent functions implemented by a processor, software, or combination thereof (e.g., firmware). The apparatus 1400 may be a computer functioning as a server.

As illustrated in FIG. 8, the apparatus or system 1400 may comprise an electrical component 1402 for receiving multi-parameter data including at least game play data and device-level data from a plurality of clients playing a video game. The component 1402 may be, or may include, a means for said receiving. Said means may include the processor 1410 coupled to the memory 1414, and to a data input/output interface 1412, the processor executing an algorithm based on program instructions stored in the memory. Such algorithm may include a sequence of more detailed operations, for example, opening a session with a data server that collects device-level data, opening a second session with a game server that collects game play data, receiving data streams from the data server and from the game server during the sessions, and placing the data from the stream in a memory formatted for use by the apparatus 1400 in subsequent processing.

The apparatus 1400 may further include an electrical component 1404 for detecting a complex association between the multi-parameter data and a defined metric measuring use of the video game, using a machine-learning algorithm operating on one or more hardware processors. The component 1404 may be, or may include, a means for said detecting. Said means may include the processor 1410 coupled to the memory 1414, the processor executing an algorithm based on program instructions stored in the memory. Such algorithm may include a sequence of more detailed operations, for example, any operable combination of the operations 400, 800, or 900 as described in connection with FIGS. 4, 8 and 9.

The apparatus 1400 may further include an electrical component 1406 for predicting an effect of changing one or more video game parameters on the defined metric, based on the complex association. The component 1406 may be, or may include, a means for said predicting. Said means may include the processor 1410 coupled to the memory 1414, the processor executing an algorithm based on program instructions stored in the memory. Such algorithm may include a sequence of more detailed operations, for example, any operable combination of the operations 1000 described in connection with FIG. 10.

The apparatus 1400 may further include an electrical component 1408 for configuring the video game after initial publication thereof so as to improve the defined metric, based on the predicting. The component 1408 may be, or may include, a means for said configuring. Said means may include the processor 1410 coupled to the memory 1414, the processor executing an algorithm based on program instructions stored in the memory. Such algorithm may include a sequence of more detailed operations, for example, any operable combination of the operations 1200, 1300 described in connection with FIGS. 12 and 13.

The apparatus 1400 may optionally include a processor module 1410 having at least one processor. The processor 1410 may be in operative communication with the modules 1402-1408 via a bus 1413 or similar communication coupling. The processor 1410 may initiate or schedule the processes or functions performed by electrical components 1402-1408.

In related aspects, the apparatus 1400 may include a data interface module 1412 operable for communicating with system components over a computer network. A data interface module may be, or may include, for example, an Ethernet port or serial port (e.g., a Universal Serial Bus (USB) port). In further related aspects, the apparatus 1400 may optionally include a module for storing information, such as, for example, a memory device 1414. The computer readable medium or the memory module 1414 may be operatively coupled to the other components of the apparatus 1400 via the bus 1413 or the like. The memory module 1414 may be adapted to store computer readable instructions and data for effecting the processes and behavior of the modules 1402-1408, and subcomponents thereof, or the processor 1410, or the operations 400, 500, 600, 800, 900, 1000, 1100, 1200 or 1300. The memory module 1414 may retain instructions for executing functions associated with the modules 1402-1408. While shown as being external to the memory 1414, it is to be understood that the modules 1402-1408 can exist within the memory 1414.

The apparatus 1400 may include a transceiver configured as a wireless transmitter/receiver, or a wired transmitter/receiver, for transmitting and receiving a communication signal to/from another system component. In alternative embodiments, the processor 1410 may include networked microprocessors from devices operating over a computer network. In addition, the apparatus 1400 may be equipped for communicating with client devices of various types, including but not limited to clients having a stereographic display or other immersive display device for displaying immersive content.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

As used herein, "virtual reality" is applied to content, applications or hardware that immerses a user in a virtual three-dimensional (3D) world, including, for example, various video game content, and animated film content. "Augmented reality" is applied content, applications or hardware that insert virtual objects into a user's perception of their physical environment. The term "mixed reality" includes both virtual reality and augmented reality. Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Such headsets enable the user to experience the displayed virtual reality content more as if the viewer were immersed in a real scene, with or without also conveying the viewer's local environment.

Various aspects will be presented in terms of systems that may include several components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be plain to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for configuring a video game, the method comprising:
   detecting, by one or more processors, an association between (i) multi-parameter data comprising game play data and device-level data and (ii) a defined metric measuring use of the video game, wherein the device-level data comprises data objects indicating a physical state of a client device independent of any higher-level application;
   predicting, by the one or more processors and based on the association, an effect of changing one or more video game parameters on the defined metric; and
   configuring, by the one or more processors, the video game after initial publication thereof to improve the defined metric, based on the predicting.

2. The method of claim 1, wherein the association represents a statistically significant correlation between the multi-parameter data and the defined metric, and wherein detecting the association comprises using a machine-learning algorithm operating on the one or more processors to correlate the multi-parameter data and the defined metric.

3. The method of claim 1, wherein detecting the association comprises using a machine-learning algorithm operating on the one or more processors, and wherein predicting the effect of changing the one or more video game parameters on the defined metric comprises reusing the machine-learning algorithm.

4. The method of claim 1, wherein predicting the effect of changing the one or more video game parameters on the defined metric comprises forming a quantitative estimate that describes a statistical likelihood that changes to the one or more video game parameters will achieve the defined metric.

5. The method of claim 1, wherein the device-level data is associated with a plurality of clients playing the video game, the method further comprising:
   dividing, by the one or more processors, device-level data into cohorts, the dividing based on a level of similarity between clients;
   detecting, by the one or more processors, the association separately for each of the cohorts; and
   selecting, by the one or more processors, one or more of the cohorts at least in part based on a utility of the association.

6. The method of claim 1, wherein configuring the video game comprises maintaining a data structure of video game parameters in a server memory configured to set game play variables for a video game executable, updating the data structure, and providing the updated data structure or a link thereto to an instance of the video game executable operating on a client device.

7. The method of claim 1, wherein configuring the video game comprises one or more of: communicating updated data to an instance of the video game executable operating on a client device, automatically altering source code of the video game, or modifying a library of script modules.

8. A system for configuring a flexible video game, comprising:
   a processor, a non-transitory computer-readable medium coupled to the processor, wherein the non-transitory computer-readable medium comprises instructions that when executed by the processor, cause the processor to perform operations comprising:
   detecting, by one or more processors, an association between (i) multi-parameter data comprising game play data and device-level data and (ii) a defined metric measuring use of a video game, wherein the device-level data comprises data objects indicating a physical state of a client device independent of any higher-level application;
   predicting, by the one or more processors and based on the association, an effect of changing one or more video game parameters on the defined metric; and
   configuring, by the one or more processors, the video game after initial publication thereof to improve the defined metric, based on the predicting.

9. The system of claim 8, wherein the association represents a statistically significant correlation between the multi-parameter data and the defined metric, and wherein detecting the association comprises using a machine-learning algorithm operating on the one or more processors to correlate the multi-parameter data and the defined metric.

10. The system of claim 8, wherein detecting the association comprises using a machine-learning algorithm operating on the one or more processors, and wherein predicting the effect of changing the one or more video game parameters on the defined metric comprises reusing the machine-learning algorithm.

11. The system of claim 8, wherein predicting the effect of changing the one or more video game parameters on the defined metric comprises forming a quantitative estimate that describes a statistical likelihood that changes to the one or more video game parameters will achieve the defined metric.

12. The system of claim 8, wherein the device-level data is associated with a plurality of clients playing the video game, wherein when executed by the processor, the instructions cause the processor to perform operations comprising:
dividing, by the one or more processors, device-level data into cohorts, the dividing based on a level of similarity between clients;
detecting, by the one or more processors, the association separately for each of the cohorts; and
selecting, by the one or more processors, one or more of the cohorts at least in part based on a utility of the association.

13. The system of claim 8, wherein configuring the video game comprises maintaining a data structure of video game parameters in a server memory configured to set game play variables for a video game executable, updating the data structure, and providing the updated data structure or a link thereto to an instance of the video game executable operating on a client device.

14. The system of claim 8, wherein configuring the video game comprises one or more of: communicating updated data to an instance of the video game executable operating on a client device, automatically altering source code of the video game, or modifying a library of script modules.

15. A non-transitory computer readable medium having program instructions stored thereon, wherein when executed by a processor, cause the processor to perform operations comprising:
detecting, by one or more processors, an association between (i) multi-parameter data comprising game play data and device-level data and (ii) a defined metric measuring use of a video game, wherein the device-level data comprises data objects indicating a physical state of a client device independent of any higher-level application;
predicting, by the one or more processors and based on the association, an effect of changing one or more video game parameters on the defined metric; and
configuring, by the one or more processors, the video game after initial publication thereof to improve the defined metric, based on the predicting.

16. The non-transitory computer readable medium of claim 15, wherein the association represents a statistically significant correlation between the multi-parameter data and the defined metric, and wherein detecting the association comprises using a machine-learning algorithm operating on the one or more processors to correlate the multi-parameter data and the defined metric.

17. The non-transitory computer readable medium of claim 15, wherein detecting the association comprises using a machine-learning algorithm operating on the one or more processors, and wherein predicting the effect of changing the one or more video game parameters on the defined metric comprises reusing the machine-learning algorithm.

18. The non-transitory computer readable medium of claim 15, wherein predicting the effect of changing the one or more video game parameters on the defined metric comprises forming a quantitative estimate that describes a statistical likelihood that changes to the one or more video game parameters will achieve the defined metric.

19. The non-transitory computer readable medium of claim 15, wherein the device-level data is associated with a plurality of clients playing the video game, wherein when executed by a processor, the instructions cause the processor to perform operations comprising:
dividing, by the one or more processors, device-level data into cohorts, the dividing based on a level of similarity between clients;
detecting, by the one or more processors, the association separately for each of the cohorts; and
selecting, by the one or more processors, one or more of the cohorts at least in part based on a utility of the association.

20. The non-transitory computer readable medium of claim 15, wherein configuring the video game comprises maintaining a data structure of video game parameters in a server memory configured to set game play variables for a video game executable, updating the data structure, and providing the updated data structure or a link thereto to an instance of the video game executable operating on a client device.

* * * * *